US012198618B2

(12) United States Patent
Sato et al.

(10) Patent No.: US 12,198,618 B2
(45) **Date of Patent: *Jan. 14, 2025**

(54) DISPLAY APPARATUS

(71) Applicant: SHARP KABUSHIKI KAISHA, Sakai (JP)

(72) Inventors: Yuichi Sato, Sakai (JP); Kenji Maeda, Sakai (JP); Shinji Yamamoto, Sakai (JP); Takuya Okamoto, Sakai (JP); Fumitaka Seki, Sakai (JP); Masafumi Ito, Sakai (JP); Yohichi Takazane, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/541,351

(22) Filed: Dec. 15, 2023

(65) Prior Publication Data

US 2024/0119894 A1 Apr. 11, 2024

Related U.S. Application Data

(63) Continuation of application No. 18/081,592, filed on Dec. 14, 2022, now Pat. No. 11,881,163, which is a continuation of application No. 17/387,590, filed on Jul. 28, 2021, now Pat. No. 11,557,250.

(30) Foreign Application Priority Data

Aug. 20, 2020 (JP) ................................ 2020-139705

(51) Int. Cl.
*G09G 3/3225* (2016.01)
*G09G 3/3275* (2016.01)

(52) U.S. Cl.
CPC ......... *G09G 3/3225* (2013.01); *G09G 3/3275* (2013.01); *G09G 2310/08* (2013.01); *G09G 2320/0247* (2013.01); *G09G 2330/021* (2013.01)

(58) Field of Classification Search
None
See application file for complete search history.

(56) References Cited

U.S. PATENT DOCUMENTS

2017/0140700 A1* 5/2017 Yamamoto .............. G09G 3/30

* cited by examiner

*Primary Examiner* — Christopher J Kohlman
(74) *Attorney, Agent, or Firm* — ScienBiziP, P.C.

(57) ABSTRACT

A display apparatus includes: a display; a display driver that drives the display such that the display displays in accordance with display data; and a host controller that transfers update display data of one screen to the display driver. The display driver includes a light-emission controller that causes a self-luminous elements to emit light, and a memory that stores the update display data of the one screen. The display driver reads the update display data on the memory after an elapse of a predetermined period of time from a drive end time at which the display controller finishes driving in accordance with the update display data and drives the screen by using the read update display data. The display driver drives the self-luminous elements once or more at a timing when the update display data from the host controller to the display driver is not updated.

6 Claims, 4 Drawing Sheets

DISPLAY APPARATUS

CROSS-REFERENCE TO RELATED APPLICATION

The present application is a continuation application of U.S. patent application Ser. No. 18/081,592, filed on Dec. 14, 2022, which is a continuation application of U.S. patent application Ser. No. 17/387,590, filed on Jul. 28, 2021, which claims priority from Japanese Application 2020-139705, filed on Aug. 20, 2020, the content of which is hereby incorporated by reference into this application.

BACKGROUND OF THE INVENTION

1. Field of the Invention

The present disclosure relates to a display apparatus.

2. Description of the Related Art

Japanese Unexamined Patent Application Publication No. 2014-52550 discloses a liquid-crystal display apparatus including oxide-semiconductor thin-film transistors (TFTs) based on indium (In), gallium (Ga), and zinc (Zn). The liquid-crystal display apparatus disclosed in Japanese Unexamined Patent Application Publication No. 2014-52550 includes oxide-semiconductor TFTs based on indium (In), gallium (Ga), and zinc (Zn). The TFT based on oxide semiconductors has a lower current leakage in an off-state. For this reason, a refresh rate may be reduced to about 1 Hz in the display apparatus based on oxide semiconductors.

SUMMARY OF THE INVENTION

When the liquid-crystal display apparatus disclosed in Japanese Unexamined Patent Application Publication No. 2014-52550 displays an image at a lower refresh rate, two or more refresh drive cycles are to be performed to achieve desired luminance or otherwise image quality may be degraded. However, if driving is performed perfunctorily to achieve desired quality, more power may be consumed.

It is desirable to provide a display apparatus that controls image quality degradation while reducing power consumption when the display apparatus is driven at a lower frequency.

According to an aspect of the disclosure, there is provided a display apparatus including a display having a screen with an array of self-luminous elements, a display driver that drives the display such that the display displays on the screen in accordance with display data, and a host controller that transfers update display data of one screen to the display driver when the display data is updated. The display driver includes a light-emission controller that causes the self-luminous elements to emit light, and a memory that stores the update display data of the one screen. The display driver reads the update display data on the memory after an elapse of a predetermined period of time from a drive end time at which the display controller finishes driving in accordance with the update display data and drives the screen by using the read update display data. The display driver drives the self-luminous elements once or more at a timing when the update display data from the host controller to the display driver is not updated.

DETAILED DESCRIPTION OF THE INVENTION

First Embodiment

First embodiment of the disclosure is described with reference to FIGS. 1 and 2.

Configuration of Display Apparatus 1

Figure 1:
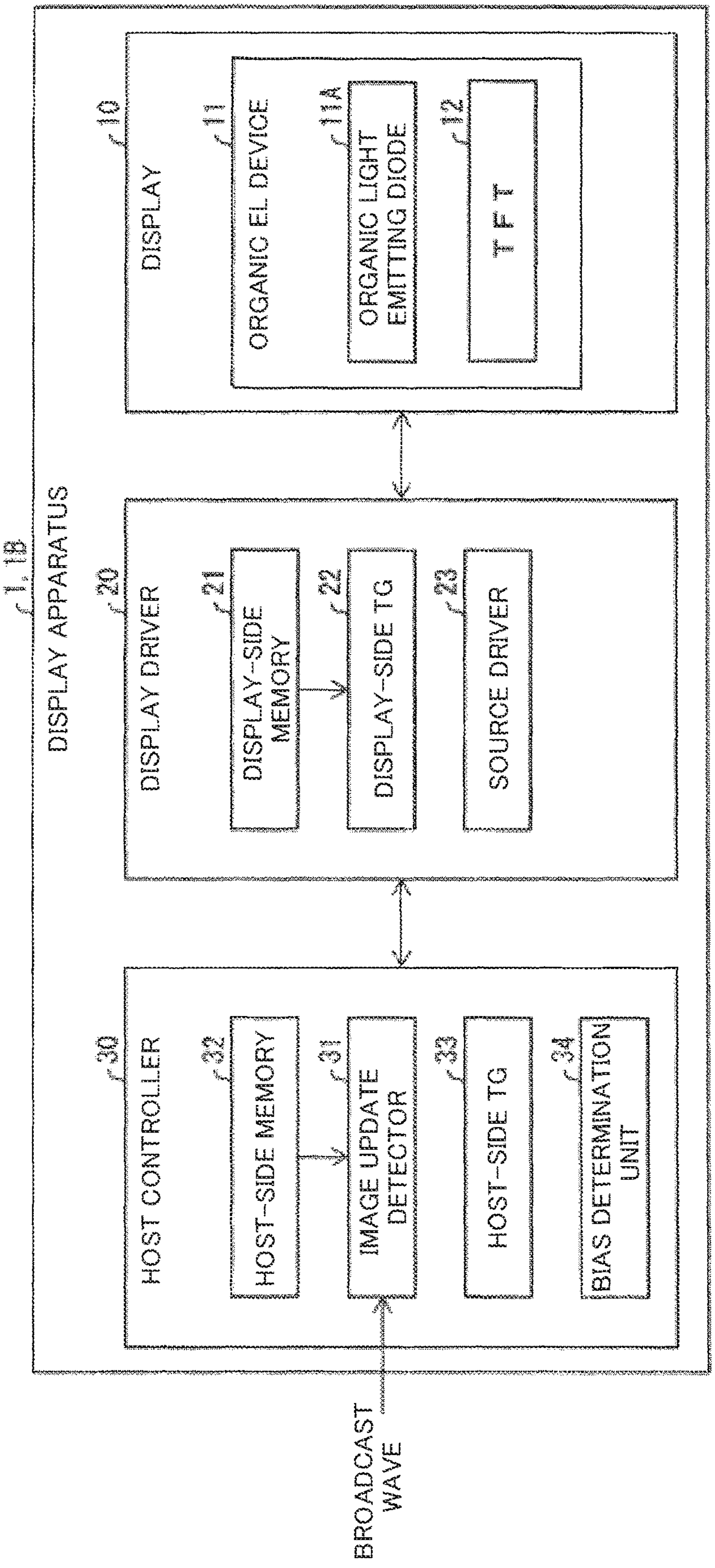
FIG. 1 is a block diagram illustrating a configuration of a display apparatus of a first embodiment of the disclosure.

FIG. 1 is a block diagram illustrating the configuration of a display apparatus 1 of the first embodiment of the disclosure. The display apparatus 1 includes a display 10, a display driver 20, and a host controller 30.

Display 10

The display 10 displays images. The display 10 includes a screen including an array of organic electroluminescent (EL) elements 11 (self-luminous elements) including organic light-emitting diodes 11A. The images displayed on the display 10 include still images and videos.

The display 10 may be an oxide-semiconductor display panel as an active matrix display. The oxide-semiconductor display panel includes switching elements arranged respectively corresponding to at least each of two-dimensionally arrayed pixels and some or all of the switching elements are oxide-semiconductor thin-film transistors (TFTs 12). The oxide-semiconductor TFT includes a semiconductor layer based on oxide semiconductor. The oxide semiconductors of the first embodiment are oxides of In, Ga, and Zn (InGaZnO-based oxide semiconductor).

Since the oxide-semiconductor TFT is characterized by a relatively high current in an on state and a relatively low leakage current in an off state, it has better charge retention characteristics. With the switching element being the oxide-semiconductor TFT, a drop in display quality may be controlled even if the refresh rate of an image to be displayed on the display 10 is reduced.

Host Controller 30

When display data is updated, the host controller 30 transfers one-screen update display data to the display driver 20. The host controller 30 includes a screen update detector 31, a host-side memory 32, and a host-side timing generator (TG) 33. For example, the host controller 30 is manufactured of a control circuit disposed on a substrate. Specifically, the host controller 30 may be a device including a Central Processing Unit (CPU), a Graphics Processing Unit (GPU), or both the CPU and the GPU.

The screen update detector 31 detects whether a screen display is to be updated on the display 10. If the screen display on the display 10 is to be updated, the screen update detector 31 acquires display data including an image to be displayed and outputs the display data to the host-side TG 33. The screen display on the display 10 is to be updated in one of the following cases (1) through (3). Case (1) applies when the screen update detector 31 receives a notice to update the display while an application stored on the host-side memory 32 is started up and then in operation on the display apparatus 1. Case (2) applies when the screen update detector 31 receives a notice to update the display from a user of the display apparatus 1 via an input unit (not illustrated). Case (3) applies when the screen update detector 31 receives a notice to update the display via data streaming on the Internet, or broadcast wave or the like.

The display data acquired by the screen update detector 31 includes an image of a frame that is to be updated and a display update flag (time reference) indicating a timing when the image is to be displayed. If the contents of an image do not change across multiple frames, the image of the frames free from change may not necessarily be included in the display data. The screen update detector 31 may detect the necessity for display update in accordance with the display update flag.

If the display data does not include the display update flag but includes data of all frames, the screen update detector 31 may determine by comparing the image of a preceding frame with the image of a subsequent frame whether the contents of the image have changed. With reference to the comparison results, the screen update detector 31 may detect the necessity for the display update. In this case, by referring to a time point of an updated frame, the screen update detector 31 detects an time interval from a change of the contents of the image to a next change of the contents of the image.

The host-side memory 32 stores data that is to be processed by the host controller 30. The host-side memory 32 may be a Video Random Access Memory (VRAM), a Read Only Memory (ROM), a Hard Disk Drive (HDD), or a Solid State Drive (SSD). The host-side memory 32 is not necessarily built in the host controller 30. For example, the host-side memory 32 may be not internal to the host controller 30 but may be external to the host controller 30 and connected to the host controller 30 from outside. The host-side memory 32 connected to the host controller 30 is intended to mean that the host-side memory 32 is internal to the host controller 30 or is connected to the host controller 30 from outside the host controller 30. The display apparatus 1 may include one or more host-side memories 32.

When the host-side TG 33 acquires the display data from the screen update detector 31, it transfers the display data to the display driver 20. Only when the display update is to be performed on the display 10 in response to the display update flag included in the display data, the host-side TG 33 transfers to the display driver 20 the display data on a frame image to be updated. The transfer of the display data may be performed in accordance with data communication specifications of mobile device, such as Mobile Industry Processor Interface (MIPI). The host-side TG 33 transfers a synchronization signal together with the display data to the display driver 20.

Display Driver 20

The display driver 20 drives the display 10 in response to an instruction from the host controller 30. For example, the display driver 20 may be a Chip on Glass (COG) driver or a Chip on Flexible (COF) driver. The COG driver is a driver that is mounted in a COP fashion on a glass substrate of the display 10. The COF driver is a driver that is mounted in a COF fashion on a flexible board of the display 10. The display driver 20 may be a Chip on Plastic (COP) driver that is a driver mounted in a COP fashion on a plastic board of the display 10. The display driver 20 includes a display-side memory 21 (memory), a display-side TG 22 (light-emission controller), and a source driver 23.

The display-side memory 21 stores the display data transferred from the host controller 30. The display-side memory 21 continues to store the display data until a next display update is performed (namely, until a change in the contents of an image). Like the host-side memory 32, the display-side memory 21 may be a VRAM.

The display-side TG 22 generates a timing signal used to drive the display 10 and supplies the timing signal to the source driver 23. Specifically, the display-side TG 22 performs one of operations (1) and (2) described below. In operation (1), if the display data received from the host controller 30 is to be updated frame by frame, the display-side TG 22 generates the timing signal such that an image is displayed at a standard refresh rate (for example, 120 Hz).

In operation (2), if the display data received from the host controller 30 is to be not updated frame by frame (in other words, no update is performed for the display data received from the host controller 30 for a predetermined period of time), the display-side TG 22 generates the timing signal such that an image is displayed with a period (for example, lower than 1 Hz) longer than the standard refresh rate.

The source driver 23 writes a display voltage responsive to the display data on a pixel on the display 10 in accordance with the timing signal supplied from the display-side TG 22.

Unlike liquid-crystal display elements that are AC driven, the organic EL elements 11 in the display apparatus 1 are free from polarity inversion and thus less likely to suffer from burn-in. The refresh rate when the display data received from the host controller 30 is not updated at every frame may be set to be lower than 1 Hz. For example, the refresh rate when the display data received from the host controller 30 is not updated at every frame may be as low as 0.017 Hz (one update approximately every minute) or 0.0056 Hz (one update approximately every 3 minutes). The display apparatus 1 may reduce the refresh rate and thus power consumption.

The display apparatus 1 may be applied as a display apparatus featuring portability, such as mobile phones, smart phones, laptops, tablet terminals, e-book readers, wearable devices, or personal digital assistants (PDAs). A desk-top personal computer (PC) includes the display 10 and the display driver 20 and further the host controller 30 that is placed in a unit (for example, a PC body) different from a display. Such a desk-top computer may also fall within the scope of an embodiment of the disclosure.

Display Driving Method

Figure 2:
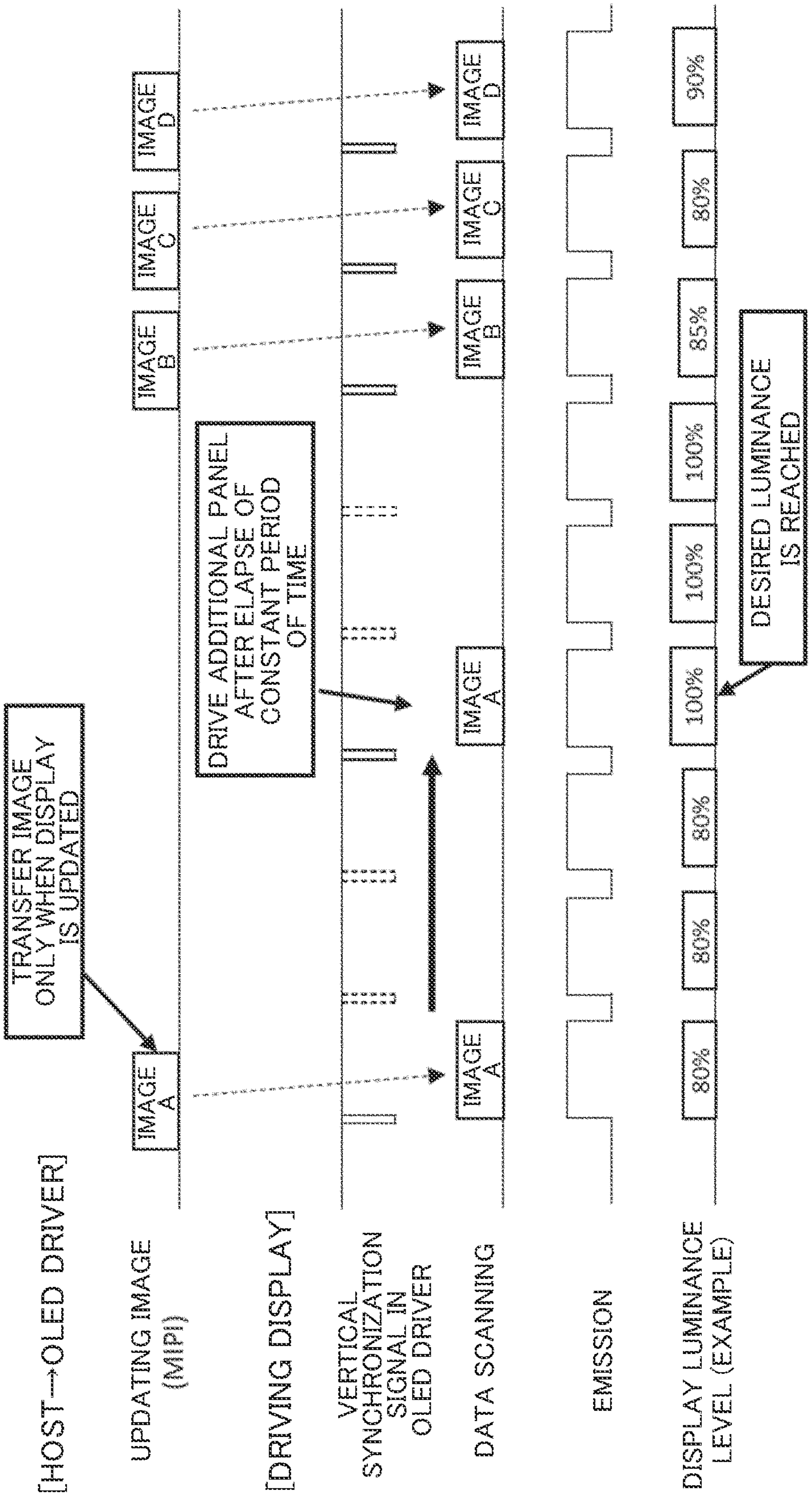
FIG. 2 is a timing chart when a video is displayed on the display apparatus of the first embodiment of the disclosure.

FIG. 2 is a timing chart when a video is displayed on the display apparatus 1. Referring to FIG. 2, images A, B, C, and D as still images are displayed on the display 10 in this order. In FIG. 2, the image A is displayed over six frames on the display 10.

Referring to FIG. 2, the display driver 20 receives first display data for the image A from the host controller 30 and causes the display-side memory 21 to store the display data.

The display driver 20 drives the display 10 in response to the first display data at a first frame. With the display 10 driven only once, a charge amount for a pixel capacity to drive the organic EL element 11 is not sufficient enough and the organic EL element 11 is not unable to reach a desired luminance level. Referring to FIG. 2, with the display 10 driven only once, the luminance level of the organic EL element 11 is 80% of the desired luminance level. If the organic EL element 11 fails to reach the desired luminance level and the refresh rate is smaller, a lower display quality results.

Since display data different from the first display data is not transferred from the host controller 30 in the first frame and multiple subsequent frames, the display-side TG 22 drives the display 10 (in refresh driving) at a frame after an elapse of a predetermined period of time from the first frame (after three frames in FIG. 2) (hereinafter referred to as an additional refresh frame). Since a pixel capacity to drive the organic EL element 11 is further charged, a charge amount on the pixel capacity to drive the organic EL element 11 becomes sufficient. A desired voltage is thus applied to the organic EL element 11. As a result, a drop in the image quality due to insufficient luminance may be controlled. The display-side TG 22 causes the organic EL element 11 to light several times at a timing when the update display data from the host controller 30 to the display driver 20 is not updated.

Since the liquid-crystal element is to be polarity inversed to control burn-in, the display is driven over at least three frames in order to make the charge amount to the pixel capacity sufficient over multiple frames and control burn-in due to polarity bias. In contrast, unlike the liquid-crystal display element that is AC driven, the organic EL element 11 in the display apparatus 1 is free from polarity inversion and thus less likely to suffer from burn-in. The organic EL element 11 is thus free from AC driving. By driving the display 10 by at least two frames, the charge amount of the pixel capacity is sufficient. As a result, the organic EL element 11 consumes power lower than the liquid-crystal display element.

In a seventh frame and subsequent frames, the display driver 20 causes the display 10 to display the images B, C, and D received from the host controller 30 at the standard refresh rate in response to the display data. Although the charge amount to the pixel capacity to drive the organic EL element 11 is not sufficient at the standard refresh rate, a change in images is fast and a drop in quality due to insufficient luminance is thus limited.

As described above, the display 10 in the display apparatus 1 includes the TFTs 12 based on oxide semiconductor of In, Ga, and Zn and a light-emitting element is based on the organic EL element 11. In this way, the refresh rate may be set to be lower than 1 Hz. The display apparatus 1 thus consumes lower power.

The display 10 in the display apparatus 1 is driven in response to the first display data in the first frame. If the display data different from the first display data is not transferred from the host controller 30 in the first frame and multiple subsequent frames, the display 10 is refresh-driven in response to the first display data at an additional frame after an elapse of predetermined period of time from the first frame and a desired voltage is applied to the organic EL element 11. By driving the display 10 over two frames, the charge amount to the pixel capacity is made sufficient. The display apparatus 1 may thus be free from a drop in quality due to insufficient luminance.

Second Embodiment

A second embodiment of the disclosure is described below. For convenience of explanation, elements having the same functions as those described with reference to the first embodiment are designated with the same reference numerals and the discussion thereof is not duplicated.

Figure 3:
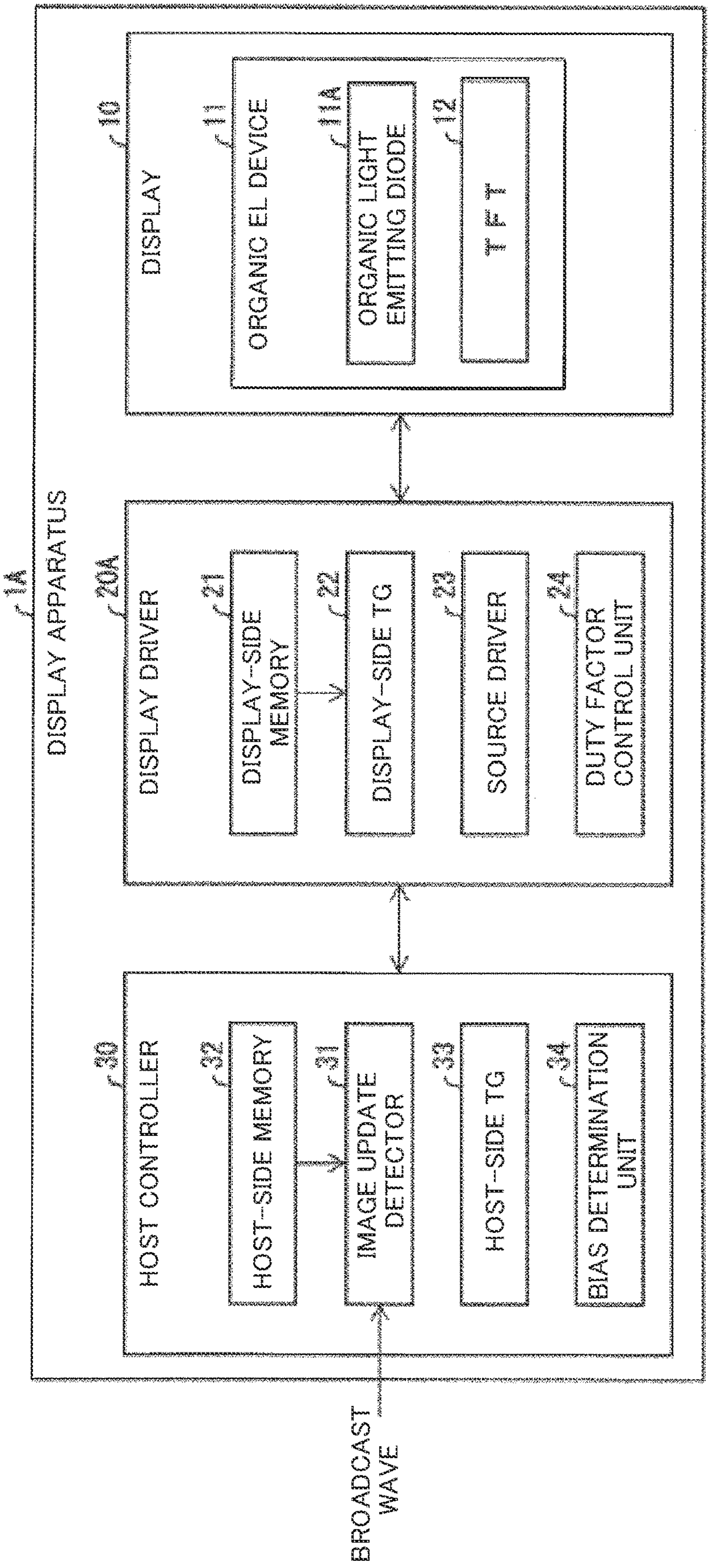
FIG. 3 is a block diagram illustrating a configuration of a display apparatus of a second embodiment of the disclosure.

FIG. 3 is a block diagram illustrating a configuration of a display apparatus 1A of the second embodiment of the disclosure. The display apparatus 1A includes a display driver 20A in place of the display driver 20 in the display apparatus 1. The display driver 20A additionally includes a duty factor control unit 24 in addition to the configuration of the display driver 20 in the display apparatus 1.

The duty factor control unit 24 controls a duty factor indicating a ratio of light emission time of the organic EL element 11 to one frame when the organic EL element 11 emits light. Specifically, the duty factor control unit 24 controls the duty factor such that a time period of light emission of the organic EL element 11 in the first frame to a frame immediately prior to the additional frame is longer than a time period of light emission of the organic EL element 11 in the additional frame and subsequent frames. In other words, when the duty factor control unit 24 causes the display 10 to display an image different from an image at an immediately preceding frame, the duty factor control unit 24 sets the duty factor to be larger than a standard duty factor in the first frame in which the different image is displayed. The duty factor control unit 24 then sets the duty factor such that the luminance of light emitted by the organic EL element 11 is at a desired level. Specifically, the duty factor control unit 24 determines the duty factor in accordance with the components of and a charge amount of each of gradations of the display data displayed in the first frame.

If the display data different from the first display data is not transferred from the host controller 30 in the first frame and multiple subsequent frames after the display 10 in the display apparatus 1 is driven in response to the first display data in the first frame, the duty factor control unit 24 sets the duty factor to the standard duty factor in the additional frame. In this way, the image with desired luminance is displayed at the additional frame and subsequent frames.

Figure 4:
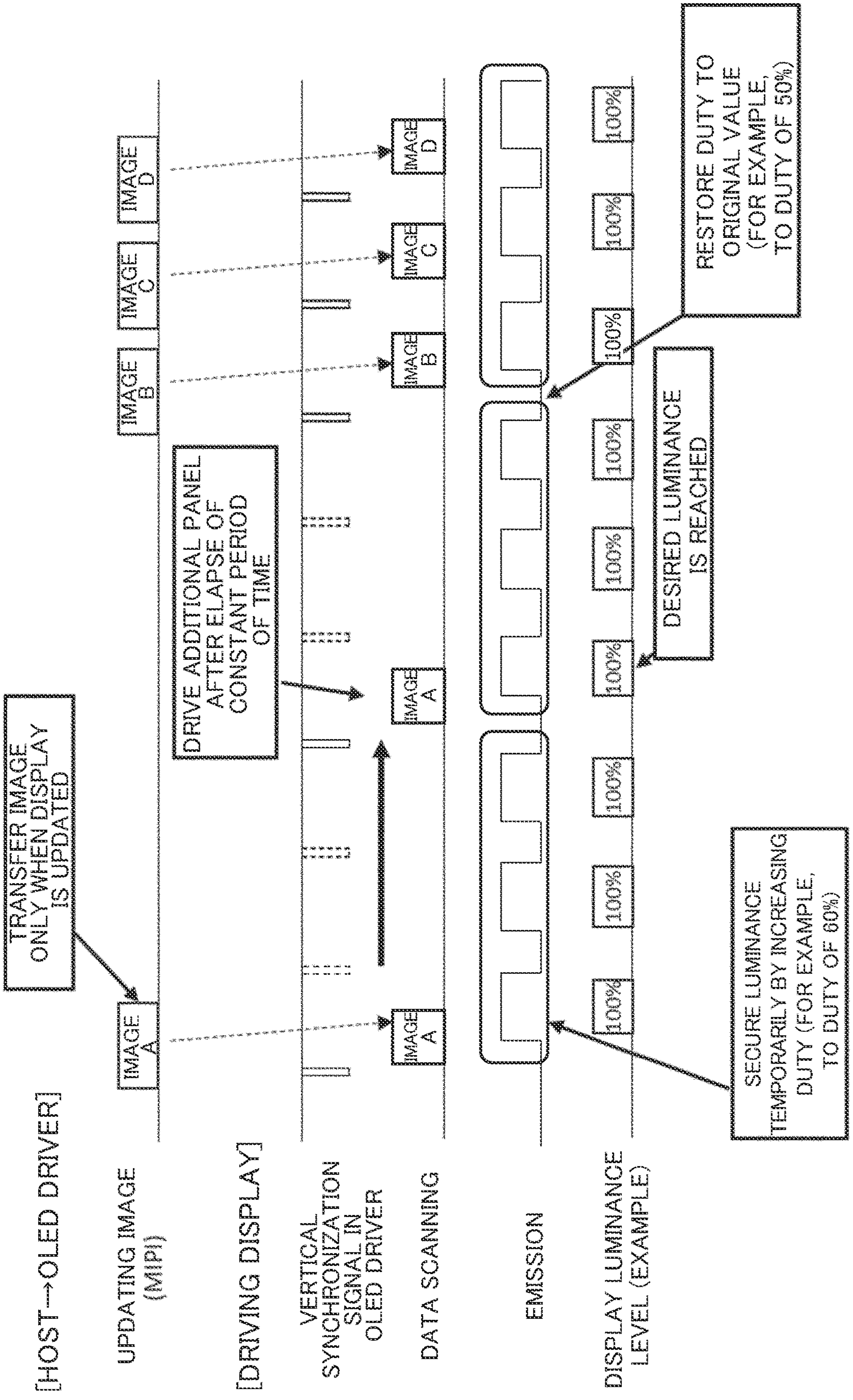
FIG. 4 is a timing chart when a video is displayed on the display apparatus of the second embodiment of the disclosure.

FIG. 4 is a timing chart when a video is displayed on the display apparatus 1A. Referring to FIG. 4, images A, B, C, and D are displayed as still images on the display 10 in this order. In FIG. 4, the image A is displayed over six frames on the display 10.

The display driver 20A drives the display 10 in accordance with the first display data in the first frame. The display 10 displays images with a duty factor (60% in FIG. 4) determined by the duty factor control unit 24 and higher than a standard duty factor (50% in FIG. 4). In this way, the display 10 displays images at a desired luminance level.

Since the display data different from the first display data is not transferred from the host controller 30 in the first frame and subsequent frames, the display-side TG 22 drives the display 10 (in refresh driving) in the additional frame in accordance with the first display data. Since the pixel capacity to drive the organic EL element 11 is further charged, the charge amount to the pixel capacity to drive the organic EL element 11 is made sufficient. As a result, the display 10 reaches a desired luminance level even with the standard duty factor (50% in FIG. 4).

In the seventh frame and consecutive frames succeeding thereto, the display driver 20A causes the display 10 to display, at the standard refresh rate, images responsive to the display data on the images B, C, and D received from the host controller 30. In the second embodiment, since the images B, C, and D are displayed with a duty factor determined by the duty factor control unit 24 and higher than the standard duty factor, the display 10 may display the images at a desired luminance level.

Third Embodiment

A third embodiment of the disclosure is described with reference to FIGS. 1 and 2. A display apparatus 1B of the third embodiment is different from the display apparatus 1 of the first embodiment in that the display apparatus 1B includes the host controller 30 with a bias determination unit 34.

Referring to FIG. 2, when the image A is displayed, an update frame and a pause frame coexist in frames between the first frame and the additional frame. In the update frame, both display refresh and the light emission of the organic EL element 11 are performed. In the pause frame, the display refresh is not performed while the light emission of the organic EL element 11 is performed. In both the update frame and the pause frame, the light emission of the organic EL element 11 is to be performed for the display apparatus 1B including EL elements serving as self-luminous elements to cause the display 10 to continuously display images.

It is known that a difference occurs between light emission luminance of the organic EL element 11 in the update frame and light emission luminance of the organic EL element 11 in the pause frame and causes flickering. It is also known that such flickering is created by a characteristic shift caused between the update frame and the pause frame in a transistor adjusting light emission current of the organic EL element 11. The characteristic shift is created by a difference in the magnitude of voltage applied to the TFT 12.

In the display apparatus 1B of the third embodiment, a bias voltage is applied to the TFT 12 to apply voltage of substantially the same magnitude regardless of whether the display apparatus 1B is in the pause frame and the update frame. The bias voltage may be applied to the TFT 12 during a light-off period throughout which the organic EL element 11 does not emit light during the pause frame.

The length of the light-off period of the organic EL element 11 in the pause frame is different depending on the light emission duty factor and the number of light emission pulses of the TFT 12. If the bias voltage having a length responsive to the light-off period is applied to the TFT 12 in the display apparatus 1B, the voltages of substantially the same magnitude may be applied to the TFT 12 regardless of the characteristics of the organic EL element 11 and display settings of the display 10. The magnitudes of the voltages applied to the TFT 12 are thus set to be substantially the same regardless of whether the display apparatus 1B is in the update frame or the pause frame.

Referring to FIG. 1, the host controller 30 includes the bias determination unit 34. During the displaying at a lower refresh rate, the bias determination unit 34 determines the magnitude of the bias voltage to be applied to the TFT 12. The bias determination unit 34 determines the magnitude of the bias voltage depending on the light-off period of the organic EL element 11 in the pause frame. In other words, during the displaying at the lower refresh rate, the bias determination unit 34 determines the magnitude of the bias voltage in response to the length of the light-off period of the organic EL element 11 that does not emit light in the pause frame.

Specifically, as the light-off period of the organic EL element 11 is shorter in the pause frame, the bias determination unit 34 sets the magnitude of the bias voltage to be larger. For example, if the light-off period of the organic EL element 11 is shorter than a predetermined threshold in the pause frame, the bias determination unit 34 sets the bias voltage to a first voltage. If the light-off period of the organic EL element 11 is equal to or longer than the predetermined threshold in the pause frame, the bias determination unit 34 sets the bias voltage to a second voltage lower than the first voltage.

In the configuration described above, if the host controller 30 determines in accordance with the gradations of an image and the luminance of the screen of the display 10 that the image is more likely to suffer from flickering, the host controller 30 may change the bias voltage. In response to the contents of the image, the host controller 30 may thus apply to the TFT 12 a bias voltage optimum for making flickering less.

Referring to FIG. 3, the host controller 30 in the display apparatus 1A of the second embodiment includes the bias determination unit 34 and the bias determination unit 34 may perform the process described above.

Modifications

The determination of the bias voltage by the bias determination unit 34 is not limited to the determination process described above. A variety of modifications may be possible to the determination process.

The bias determination unit 34 may determine the magnitude of the bias voltage in view of the characteristics of the display 10. The characteristics of the display 10 may indicate how the characteristic shift of the transistor occurs as the refresh rate becomes lower. For example, depending on the characteristics of the display 10, the characteristic shift of the TFT 12 may be controlled by using substantially the same bias voltage toward the lowest settable refresh rate (for example, 0.0056 Hz). In such a case, the bias determination unit 34 may set the bias voltage to the most practicable level when the refresh rate is at the lowest.

Depending on the characteristics of the display 10, it may be difficult to control the characteristic shift of the TFT 12 on substantially the same bias voltage at a lower refresh rate. In such a case, after the pause frame has continued for a predetermined period of time, the bias determination unit 34 may change the bias voltage to a more appropriate value.

The bias determination unit 34 may determine the magnitude of the bias voltage in response to a temperature of the display 10. Specifically, the display 10 may include a temperature sensor that detects the temperature of the display 10 and the bias determination unit 34 may acquire the temperature of the display 10 from the temperature sensor. Since the characteristic shift of the TFT 12 is more likely to occur as the temperature of the display 10 is higher, the bias voltage is to be controlled more strictly.

Depending on the refresh rate and the characteristics of the display 10, controlling the bias voltage alone by the bias determination unit 34 may not be sufficient enough to control the occurrence of flickering. For example, the flicking is not sufficiently controlled if the voltage determined by the bias determination unit 34 is higher than an upper limit value of voltage applicable to the transistor. In such a case, the host controller 30 sets the lower limit value of the refresh rate and then does not set a refresh rate that is equal to or lower than the lower limit value. In other words, if the bias voltage determined by the bias determination unit 34 is higher than the voltage applicable to the EL element, the host controller 30 may set the lower limit value settable as the refresh rate to a value higher than the lower limit value of the refresh rate.

The visibility of flickering is deferent depending on the luminance level of the screen of the display 10. Accordingly, the bias determination unit 34 may determine the magnitude of the bias voltage in view of the luminance level. For example, since the visibility of flickering is higher as the luminance level of the screen of the display 10 is lower. When the luminance level is lower than a predetermined threshold, the bias determination unit 34 may determine the bias voltage. In this case, the host controller 30 may set the lower limit value of the refresh rate in response to the luminance level.

Implementation Using Software

Control block (specifically, the host controller 30 and the display drivers 20 and 20A) in the display apparatuses 1, 1A, and 1B may be implemented by a logic circuit (hardware) formed on an integrated circuit (IC) chip or by software.

If software is used, each of the display apparatuses 1, 1A, and 1B includes a computer that executes a program that is software implementing each function. The computer includes at least one processor (control device) and at least one computer readable recording medium storing the program. The processor in the computer implements the embodiments of the disclosure by reading the program from the recording medium and executing the read program. The processor may be a Central Processing Unit (CPU). The recording medium may be a non-transitory tangible medium, such as a Read Only Memory (ROM), tape, disk, card, semiconductor memory, or programmable logic circuit. The computer may also include a Random Access Memory (RAM) on which the program is expanded. The program may be delivered to the computer via any transmission medium (such as a communication network or broadcast wave) that transmits the program. An embodiment of the disclosure may be implemented by a data signal that is embedded in a carrier wave and embodied by electronic transmission of the program.

CONCLUSION

According to a first aspect of the disclosure, there is provided a display apparatus 1, LA, or 1B including a display having a screen with an array of self-luminous elements, a display driver that drives the display such that the display displays on the screen in accordance with display data, and a host controller that transfers update display data of one screen to the display driver when the display data is updated. The display driver includes a light-emission controller that causes the self-luminous elements to emit light and a memory that stores the update display data of the one screen. The display driver reads the update display data on the memory after an elapse of a predetermined period of time from a drive end time at which the display controller finishes driving in accordance with the update display data and drives the screen by using the read update display data. The display driver drives the self-luminous elements once or more at a timing when the update display data from the host controller to the display driver is not updated.

In the display apparatus according to a second aspect of the disclosure in view of the first aspect, the display may include thin-film transistors (TFTs) based on oxide semiconductor. If the display data is not transferred from the host controller in a frame immediately subsequent to a first frame after the display is driven in the first frame in accordance with first display data, the display driver may drive one or more times the display in an additional frame successive to the first frame in accordance with the first display data.

In the display apparatus according to a third aspect of the disclosure in view of the first aspect, the display may include TFTs based on oxide semiconductor. If the display data is not transferred from the host controller in a first frame or more subsequent frames after the display is driven in the first frame in accordance with first display data, the display driver may drive one or more times the display in an additional frame after an elapse of a constant period of time from the first frame in accordance with the first display data.

In the display apparatus according to a fourth aspect of the disclosure in view of one of the second and third aspects, a refresh rate of driving indicating an update frequency of updating display contents on the screen in accordance with the first display data after the predetermined period of time may be equal to or lower than a maximum frequency available in the driving.

In the display apparatus according to a fifth aspect of the disclosure in view of the third aspect, the display driver may drive the display such that a period of time of light emission of the self-luminous elements from the first frame to a frame immediately prior to the additional frame is set to be longer than a period of time of the light emission of the self-luminous elements in and after the additional frame.

In the display apparatus according to a sixth aspect of the disclosure in view of the fifth aspect, the period of time of the light emission of the self-luminous elements from the first frame to the frame immediately prior to the additional frame may be calculated in accordance with contents of each of gradations in the first display data and an amount of charge at each of the gradations.

In the display apparatus according to a seventh aspect of the disclosure in view of one of the first through six aspects, driving the display free from data rewriting may be performed one or more times in a pause frame.

In the display apparatus according to an eight aspect of the disclosure in view of the seventh aspect, at least one of a magnitude or a duration of a voltage used to drive the display free from the data rewriting may be determined in accordance with characteristics of an individual element in the display apparatus.

In the display apparatus according to a ninth aspect of the disclosure in view of the seventh aspect, at least one of a magnitude or a duration of a voltage used to drive the display free from the data rewriting may be determined in accordance with a temperature of the display in the display apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a display having a screen in which self-luminous elements are arranged;

a display driver that drives the display such that the display displays, on the screen, based on display data; and a host controller that transfers updated display data of the screen to the display driver when the display data is updated, wherein:

in a first frame when first display data is transferred from the host controller, as the updated display data, to the display driver, the display driver drives the display, such that the screen of the display is refreshed based on the first display data and light is emitted from the self-luminous elements, during a period between a time of a transfer of the first display data and a time when other display data, different from the first display data, is transferred after a predetermined period of time has elapsed:

the display driver drives the display, such that, in a generated refresh frame, the screen of the display is refreshed based on the first display data and the light is emitted from the self-luminous elements, and in a generated pause frame, the screen of the display is not refreshed and the light is emitted from the self-luminous elements, and the generated refresh frame is an additional refresh frame in which the screen of the display is refreshed based on the first display data and the light is emitted from the self-luminous elements, such that one or more of the self-luminous elements without a desired luminance in the first frame reach the desired luminance.

2. The display device according to claim 1, wherein the display driver has a memory storing the first display data for a single screen, and the additional refresh frame is a frame in which the first display data stored in the memory is read, and in which the screen of the display is refreshed based on the read first display data and the light is emitted from the self-luminous elements.

3. The display device according to claim 1, wherein if the updated display data is not transferred from the host controller in a frame that is immediately subsequent to the first frame after the display is driven in the first frame based on first display data, the display driver drives the display one or more times in an additional frame that is successive to the first frame based on the first display data.

4. The display device according to claim 3, wherein a refresh rate of driving, indicating an update frequency of updating display contents on the screen based on the first display data after the predetermined period of time, is equal to or lower than a maximum frequency available in the driving.

5. The display device according to claim 1, wherein if the updated display data is not transferred from the host controller in the first frame or more subsequent frames after the display is driven in the first frame based on the first display data, the display driver drives the display one or more times in an additional frame after an elapse of a constant period of time from the first frame based on the first display data.

6. A display device comprising:

a display having a screen in which self-luminous elements are arranged;

a display driver that drives the display such that the display displays, on the screen, based on display data; and a host controller that transfers updated display data of the screen to the display driver when the display data is updated, wherein:

in a first frame when first display data is transferred from the host controller, as the updated display data, to the display driver, the display driver drives the display, such that the screen of the display is refreshed based on the first display data and light is emitted from the self-luminous elements, during a period between a time of a transfer of the first display data and a time when other display data, different from the first display data, is transferred after a predetermined period of time has elapsed:

the display driver drives the display, such that in a generated refresh frame, the screen of the display is refreshed based on the first display data and the light is emitted from the self-luminous elements, and in a generated pause frame, the screen of the display is not refreshed and the light is emitted from the self-luminous elements, and the generated refresh frame is an additional refresh frame in which the screen of the display of the first frame is refreshed again and the light is emitted again from the self-luminous elements.

* * * * *